United States Patent [19]

Ona

[11] 4,388,437
[45] Jun. 14, 1983

[54] AMINO-FUNCTIONAL SILICONE EMULSIONS

[75] Inventor: Isao Ona, Sodegaura, Japan

[73] Assignee: Toray Silicone Company, Ltd., Tokyo, Japan

[21] Appl. No.: 332,063

[22] Filed: Dec. 18, 1981

[30] Foreign Application Priority Data

Dec. 29, 1980 [JP] Japan ................................ 55-187704

[51] Int. Cl.$^3$ ............................................. C08L 83/06
[52] U.S. Cl. .................................. 524/588; 8/DIG. 1; 8/581; 106/287.11; 106/287.12; 106/287.13; 106/287.14; 428/266; 428/391; 428/447; 524/236; 524/247; 524/327; 524/329; 524/382; 524/398; 524/399
[58] Field of Search ............... 524/382, 398, 588, 399, 524/236, 247, 327; 8/581, DIG. 1; 106/287.11

[56] References Cited

U.S. PATENT DOCUMENTS 3,284,391 11/1966 Campbell ............................ 524/382
4,247,592 1/1981 Kalinowski ........................ 428/266

Primary Examiner—Theodore E. Pertilla
Attorney, Agent, or Firm—George A. Grindahl

[57] ABSTRACT

Disclosed are organopolysiloxane compositions comprising an aminofunctional organopolysiloxane, a surfactant, an organotitanate, —zirconate or —germanate, an organic acid and water. These compositions having a pH of from 2.5 to less than 7.0, are useful for treating fibers to durably provide desirable characteristics, such as crease resistance, softness, elongation recovery and water repellency.

6 Claims, No Drawings

AMINO-FUNCTIONAL SILICONE EMULSIONS

BACKGROUND OF THE INVENTION

This invention concerns an organopolysiloxane emulsion composition. In particular, it concerns an organopolysiloxane composition which can give fibers extremely long-lasting crease resistance, softness, good elongation recovery and water repellency, when the composition is used in fiber treatment, by adsorption of organopolysiloxane to the fiber materials.

Many organopolysiloxane compositions have been supplied or proposed to provide textile materials with crease resistance, softness, elongation recovery, and water repellency. For example, dimethylpolysiloxane oil or its emulsion is known to give softness. Treatment agents composed of methyl hydrogen polysiloxane, dimethylpolysiloxane terminated at both ends with hydroxyl groups, and a condensation reaction catalyst; and treatment agents composed of methyl hydrogen polysiloxane, diorganopolysiloxane containing vinyl groups, and an addition reaction catalyst, are also known to give long-lasting softness, crease resistance and elongation recovery.

It was recently reported in Japan Patent Koho Sho No. 48[1973]-17514 that treating fibers with an agent composed of an organopolysiloxane having at least two epoxy groups per molecule and an organopolysiloxane with an amino group yields organic synthetic fibers with softness. Japan Patent Koho Sho No. 53[1978]-36079 proposed as a textile treating agent, a mixture of diorganopolysiloxane terminated at both ends with hydroxyl groups, an organosilane containing both an amino group and an alkoxy group per molecule and/or its partially hydrolyzed products and condensation products. A mixture of an aminoalkyltrialkoxysilane and an organopolysiloxane containing an epoxy group was found in Japan Patent Koho Sho No. 53[1978]-19715 and Sho No. 53[1978]-19716 as an effective textile treating agent. A diorganopolysiloxane terminated at both ends with triorganosiloxy groups and containing at least 2 aminoalkyl groups per molecule was claimed to be an effective treating agent by Japan Patent Kokai Sho No. 53[1978]-98499.

These conventionally-known treating agents have a common inherent defect; namely, they are merely applied onto the fiber surface or they merely form a hardened layer on the fiber surface, and although they can provide some durability, the durability of the treatment using these agents is limited when subjected to rubbing and repeated washing because of the weak bonding between the fiber of these agents.

BRIEF SUMMARY OF THE INVENTION

To eliminate these defects, the present inventor invented a silicone composition which is strongly adsorbed by fibers, thereby providing long-lasting crease resistance, softness, elongation recovery, and water repellency.

This invention relates to an organopolysiloxane composition consisting essentially of (A) 100 parts by weight of an organopolysiloxane having the formula $R_aX_bY_cSiO_{(4-a-b-c)/2}$; wherein R denotes a monovalent unsubstituted or substituted hydrocarbon group free of amino substituents, X denotes an aminofunctional group having the formula $-R^1(NHCH_2CH_2)_dNHR^2$ wherein $R^1$ denotes a divalent hydrocarbon group, $R^2$ denotes a hydrogen atom or a monovalent hydrocarbon group and d has a value of 0, 1, 2, or 3; Y denotes a hydroxyl group or an alkoxy group, a+b+c has a value of from greater than 1.9001 to 2.1, a has a value of from grater than 1.9 to less than 2.1, b has a value of from 0.0001 to 0.1 and c has a value of from 0 to 0.1, (B) 1 to 100 parts by weight of a nonionic or cationic surfactant, (C) 0.1 to 50 parts by weight of an organotitanate, an organozirconate or an organogermanate, (D) a sufficient amount of an organic acid to provide a pH of from 2.5 to less than 7.0 for the organopolysiloxane composition and (E) an emulsion-forming amount of water.

DETAILED DESCRIPTION OF THE INVENTION

The organopolysiloxane component (A) has the aforementioned general formula. In the formula R is a monovalent unsubstituted or substituted hydrocarbon group having from 1 to 20 carbon atoms; such as methyl, ethyl, propyl, dodecyl, vinyl, phenyl, $\beta$-phenylmethyl, 3-chloropropyl, $\beta$-cyanoethyl, or 3,3,3-trifluoropropyl. In this organopolysiloxane R need not always be the same but at least half the R groups should be methyl groups. The number of R groups per silicon atom, a, should be greater than 1.9001 but less than 2.10. X is $-R^1(NHCH_2CH_2)_dNHR^2$ where $R^1$ is a divalent hydrocarbon group such as an alkylene group, such as $-CH_2-$, $-CH_2CH_2-$, $-CH_2CH_2CH_2-$, $-CH_2CH(CH_3)CH_2-$, $-(CH_2)_4-$; or an alkyleneaarylene group such as $-(CH_2)_2(CH_6H_4)-$. Among these divalent groups the propylene group is the most common. $R^2$ is either hydrogen or a monovalent hydrocarbon group, such as methyl, ethyl, propyl, hexyl or phenyl. The subscript d is an integer of 0 to 3. The number of X groups per silicon atom, b, ranges from 0.0001 to 0.1, preferably from 0.001 to 0.05. Y is either a hydroxyl or an alkoxy group having from 1 to 20 carbon atoms. The number of Y groups per silicon atom, c, ranges from 0 to 0.1. Y can be located at any position of the organopolysiloxane but generally it is located at the end. A triorganosilyl group in which the organic groups include R and X mentioned previously can also be used as an end group. The viscosity of organopolysiloxane (A) at 25° C. ranges from several centistokes to several ten million centistokes, preferably from 100 to 10,000 centistokes, more preferably 1,000 to 10,000 centistokes.

The organopolysiloxane of component (A) can be easily prepared by a conventional method. As shown in U.S. Pat. No. 4,247,592, the synthetic methods include the addition reaction of an organohydrogenpolysiloxane with $CH_2=CCH_3CH_2(NHCH_2CH_2)_dNHR^2$; a condensation reaction of $H_2NCH_2CH_2NH_2$ with an organopolysiloxane containing a $-SiCH_2CH_2CH_2Cl$ group; and hydrolysis of a reaction product of a cyclic siloxane or $\alpha,\omega$-dihydroxyorganopolysiloxane with $R(Z)_2SiR^1(NHCH_2CH_2)_dNHR^2$ wherein Z is a hydrolyzable group and R, $R^1$, $R^2$, and d are defined previously, to which $R_3SiZ$ or $R_2XSiZ$ as an endblocking group and a trifunctional silane of $RSiZ_3$ or $XSiZ_3$ can be added. Preparation of the organopolysiloxane (A) is, however, not restricted to these methods. The organopolysiloxane in this invention may contain unreacted chemicals as impurities. More than one kind of organopolysiloxane with different molecular weight and different number and kinds of X can also be present, as is well known.

In this organopolysiloxane X can be bonded to any silicon atom, such as at one or both terminal silicons, or at an internal and at a terminal silicon or at an internal and at both terminal silicons or in the form of $XSiO_{3/2}$. Among these possibilities a preferable organopolysiloxane has a general formula given by

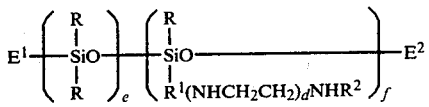

where R, $R^1$, $R^2$, and d are defined previously, e is 10 to 1,000, f is 1 to 20, $E^1$ is OH, OR, $R_3SiO$, or $R_2XSiO$, and $E^2$ is H, R, $R_3Si$, or $R_2XSi$, in which X is $-R^1(NHCH_2CH_2)_dNHR^2$. Other preferable organopolysiloxane includes the derivative of the general formula mentioned above with $RSiO_{3/2}$ and/or $XSiO_{3/2}$ units present.

In the amine-functional group, $-R^1(NH_2CH_2CH_2)_dNHR^2$, d preferably has a value of zero, because the organopolysiloxane with a higher number of d causes yellowing, i.e. the so-called "amine burn" of fibers treated. The organopolysiloxane with the resulting $-R^1NHR^2$ group is slowly adsorbed on fibers, easing control of treatment.

Treating fibers with the organopolysiloxane having $RSiO_{3/2}$ and/or $XSiO_{3/2}$ units as component (A) gives fibers good elasticity which cannot be obtained by the linear chain organopolysiloxane.

A surfactant as component (B) is used to emulsify component (A) and includes a nonionic surfactant, such as a polyoxyalkylene alkyl ether, polyoxyalkylene alkylphenol ether, polyoxyalkylene alkyl ester, sorbitan alkyl ester, or polyoxyalkylenesorbitan alkyl ester; or a cationic surfactant, such as an aliphatic amine salt, quaternary ammonium salt, or alkylpyridinium salt. The surfactants listed above can be used singly or in combination. An anionic or amphoteric surfactant cannot be used because of reactivity with the amino group in component (A) resulting in no emulsification.

An amount of component (B) ranges from 1 to 100 parts by weight to emulsify 100 parts by weight of component (A).

An organotitanate, organozirconate, or organogermanate as component (C) plays an important role in adsorption of emulsified component (A) on fibers after adjusting the pH to a desired range with component (D). Lack of either component (C) or (D) leads to no adsorption of component (A) to a fabric treated therewith.

Component (C) includes tetraethyltitanate, tetraisopropyltitanate, tetra-n-butyltitanate, tetra-2-ethylhexyltitanate, tetraphenyltitanate, tetraoctadecyltitanate, tetrastearyltitanate, diisopropylbis(acetylacetone)titanate, tri-n-butylmonostearyltitanate, tetraoctylenegylcoltitanium, dihydroxybis(lactic acid)titanium, $Ti(OC_2H_4NH_2)_4$, $(C_3H_7O)Ti(OC_2H_4NH_2)_3$, $(C_3H_7O)_2Ti(OC_2H_4NH_2)_2$, $(C_4H_9O)_3Ti(OC_2H_4NH_2)$, $Ti\{OC_2H_4NH(C_2H_4OH)\}_4$, $(C_4H_9O)Ti\{OC_2H_4NH(C_2H_4OH)\}_3$, $(C_4H_9O)_2Ti\{OC_2H_4NH(C_2H_4OH)\}_2$, $(C_4H_9O)_3TiOC_2H_4NH(C_2H_4OH)$, $Ti\{OC_2H_4N(C_2H_4OH)_2\}_4$, $(C_4H_9O)Ti\{OC_2H_4N(C_2H_4OH)_2\}_3$, $(C_4H_9O)_2Ti\{OC_2H_4N(C_2H_4OH)_2\}_2$, $(C_4H_9O)_3TiOC_2H_4N(C_2H_4OH)_2$, $(C_3H_7O)_2Ti\{OC_2H_4N(C_3H_6OH)_2\}_2$,

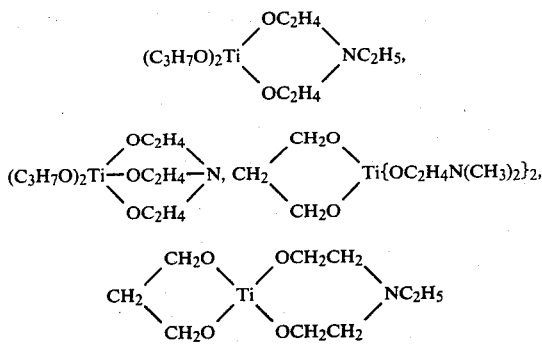

and partially hydrolyzed derivatives of these compounds. A similar compound in which a titanium atom is replaced with a zirconium or germanium atom can also be used. Component (C) listed above can be employed singly or in combination.

When the pH value of the organopolysiloxane composition is adjusted to within a certain range by addition of component (D), component (C) serves to promote adsorption of component (A) onto fibers and other processed materials. A preferable component (C) is the organotitanate with at least one aminoalkoxy group, such as $-OC_2H_4NH_2$, $-OC_2H_4NH(C_2H_4OH)$ or $-OC_2H_4N(C_2H_4OH)_2$ because both excessively large or small adsorption rates can make the treatment of fibers and other processed material difficult. The amount of component (C) ranges from 0.1 to 50 parts by weight, preferably from 1 to 20 parts by weight per 100 parts by weight of component (A).

An organic acid as component (D) in this invention is essential to adjust the pH of the organopolysiloxane composition to a desired range to control the adsorption rate of emulsified component (A) on fibers. An organic acid includes a saturated aliphatic monocarboxylic acid, such as formic acid, acetic acid, propionic acid, caproic acid, caprylic acid; or a saturated aliphatic dicarboxylic acid, such as malonic acid, succinic acid, or glutaric acid; or an unsaturated aliphatic carboxylic acid, such as acrylic acid or butenoic acid; or an aromatic carboxylic acid, such as benzoic acid. The organic acid can be added singly or in combination. The saturated aliphatic monocarboxylic acid is preferable.

Component (D) is added to adjust the pH of the composition containing (A) to (E) to a range of from 2.5 to less than 7.0. Above or below this pH range an amount of component (A) adsorbed is decreased. A preferable pH range is between 4 and 6. If necessary, a mineral acid can be added.

Water as component (E) is added to form an emulsion. The quantity of water is sufficient to form an emulsion and is not further restricted.

In addition to components (A) to (E) there can be added an organosilane or organohydrogenpolysiloxane; a buffer solution, such as magnesium sulfate to improve adsorption stability; an organometallic condensation catalyst, such as a tin, zinc, lead, or cobalt derivative; a colorant, such as a dye or pigment; inorganic powders, such as silica or mica; and other additives, such as conventional antistatic agents, softeners, crease-free agents, heat durable agents, or flame retardants.

To prepare the compositions in this invention components (A), (B), and (E) are mixed to yield an emulsion to which components (C) and (D) are added before use.

Treating with this composition gives various fibers and paper crease-resistant properties, softness, water repellency, and elongation recovery. This composition is used as a water repellent and/or a gloss agent for a natural or synthetic leather, a plastic film, a molded product of a synthetic resin, or natural or synthetic rubber, or glass. This composition is particularly useful for treating fibers and paper. A treating method includes, but is not limited to, spraying, immersing, roller pressing, or brushing.

Examples of a fiber material are natural fibers, such as wool, silk, cotton hemp, or asbestos; regenerated fibers, such as rayon or cellulose acetate; synthetic fibers, such as polyester, polyamide, vinylon, polyacrylonitrile, polyethylene, polypropylene, or spandex; glass fibers, carbon fibers, or silicon carbide fibers. The form of the fibers may be stable, filament, cane, yarn, woven fabric, knitted fabric, nonwoven fabric, or resin finished cloth. Particularly effective is continuous treatment of a staple, filament, cane, woven fabric, knitted fabric, nonwoven fabric, or filling material for mattresses.

The compositions of this invention exhibit the peculiarity that when, for example, fiber material is immersed in the aqueous emulsion composed of components (A) to (E), component (A) is adsorbed on the fiber in 10-120 minutes, and the white cloudy emulsion changes to a clear solution. The water may simply be removed, mechanically, but it is best to heat the fiber material to 100°-200° C. An accompanying effect is that the waste liquid can be drained as is without treatment, but from the standpoint of waste water treatment, it is an extremely important effect.

The following examples are disclosed to further illustrate, but not to limit, the present invention. "Parts" in the example indicates "parts by weight" and the viscosity is measured at 25° C. Me indicates the methyl radical.

an effect of treatment. The adsorptivity was determined by measuring the silicone concentration of the emulsion (0.025 ml in a microsyringe) before and after treatment by fluorescent X-ray analysis. When the pH value is below 2 or above 7, the adsorptivity is drastically decreased. The optimum pH range is between 4 and 6. As a comparative example, a similar emulsion described above but not containing di-n-butyl bis(triethanolamine)titanate was used at pH 6. With this comparative emulsion adsorptivity of the organopolysiloxane was no more than 5%, there was no change in the emulsion before or after treatment, and good treatment effects were not found.

TABLE

| pH | Emulsion Appearance Before Treatment | Emulsion Appearance After Treatment | Adsorptivity (%) | Effect of Treatment |
|---|---|---|---|---|
| 2 | Cloudy | Slightly cloudy | 32 | Slightly insufficient in softness and elongation recovery, but good in water repellency. |
| 3 | Cloudy | Barely cloudy | 65 | Good in softness, elongation recovery, and water repellency |
| 4 | Cloudy | Clear | 88 | Excellent in softness, elongation recovery, and water repellency |
| 5 | Cloudy | Clear | 91 | Excellent in softness, elongation recovery, and water repellency |
| 6 | Cloudy | Clear | 93 | Excellent in softness, elongation recovery and water repellency |
| 7 | Cloudy | Barely cloudy | 63 | Similar to the result at pH 3 |
| 8 | Cloudy | Slightly cloudy | 38 | Similar to the result at pH 2 |

EXAMPLE 1

A mixture of octamethylcyclotetrasiloxane (94.16 parts), $CH_3(CH_3O)_2Si(CH_2)_3NHCH_2CH_2NH_2$ (5.33 parts), hexamethyldisiloxane (0.51 part) as a source of endblocking groups, and potassium hydroxide (0.02 part) as a catalyst was heated to 130° C. for 10 hours to yield an organopolysiloxane containing the amino group and having a viscosity of 1,450 centistokes. The chemical structure is given by (I).

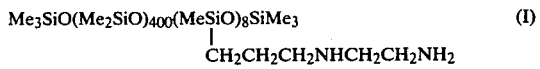

$$Me_3SiO(Me_2SiO)_{400}(MeSiO)_8SiMe_3 \quad \text{(I)}$$
$$| $$
$$CH_2CH_2CH_2NHCH_2CH_2NH_2$$

This organopolysiloxane (30 parts) was emulsified with 3 parts of a mixture of three kinds of polyoxyethylene nonphenol ethers having different HLB in the presence of water (67 parts). This mixture of polyoxyethylene nonylphenol ethers consisted of 60% of an ether having an HLB value of 10.5, 20% of an ether having an HLB value of 12.1 and 20% of an ether having an HLB value of 13.7.

This emulsion (3 parts) was diluted with water (2000 parts), to which di-n-butylbis(triethanolamine)-titanate (0.1 part) was added. Acetic acid was then added to adjust pH to the range given in the Table. A polyester knitted fabric (100 g) was immersed in this emulsion for 120 minutes at ambient temperature, nipped, and dried with hot air at 105° C. for 10 minutes. The table summarizes the appearance of the emulsion before and after treatment, adsorptivity of the organopolysiloxane and

EXAMPLE 2

A mixture of dimethylpolysiloxane (100 parts, viscosity=80 centistokes) with the hydroxyl group at both ends, $CH_3(CH_3O)_2SiNHCH_2CH_2NH_2$ (1.2 part), potassium hydroxide (0.08 part), and $(CH_3O)_3SiNHCH_2CH_2NH_2$ (0.3 part) was heated at 130° C. for 3 hours for yield an aminofunctional organopolysiloxane (II) having a viscosity of 3,500 centistokes. The resulting organopolysiloxane was emulsified similarly to Example 1. The emulsion (3 parts) was diluted with water (2,000 ml), to which di-n-butyl bis(triethanolamine)titanate (0.1 part) and acetic acid were added to adjust pH to 5. A 100% cotton knitted fabric (100 g) was dipped in this emulsion at ambient temperature for 120 minutes, nipped, dried at room temperature, and heated at 150° C. for 2 minutes. The emulsion after treatment became clear. The adsorptivity, determined by fluorescent X-ray analysis, was 90%.

The fabric treated with organopolysiloxane (II) had a pleasant feel and moderate resiliance, whereas the fabric treated (adsorptivity=92%) with organopolysiloxane (I) obtained in Example 1 had a pleasant feel but there was a strong slick feeling.

EXAMPLE 3

A dimethylpolysiloxane with the hydroxyl group at both ends (99.2 parts, viscosity=3,000 centistokes) was condensed with $CH_3(CH_3O)_2Si(CH_2)_3NH_2$ (0.8 part) to give an amino-functional organopolysiloxane (III) with a viscosity of 7,800 centistokes.

Similarly, a dimethylpolysiloxane with the hydroxyl group at both ends (99.0 parts, viscosity=3,000 centistokes) was reacted with $CH_3(CH_3O)_2Si(CH_2)_3NHCH_2CH_2NH_2$ (1.0 part, mole equivalent to the aminosilane described above) to form an aminofunctional organopolysiloxane (IV) with a viscosity of 7.850 centistokes.

The organopolysiloxanes (III) and (IV) were emulsified and converted to a treating emulsion (pH 6) similarly to Example 1. Immersion of a 100% cotton knitted fabric (100 g), treated with a fluorescent brightener, at ambient temperature for 120 minutes converted the emulsion from cloudy to clear. After being nipped, the fabric was dried at room temperature. The adsorptivity, measured by fluorescent X-ray analysis, was 91% for both fabrics. After being cut into a size of 10×10 cm, the fabric was heated in a hot air circulating oven at 150° C. for 20 minutes. Yellowing of the fabric (the so-called amine-burn) was rated by a gray scale for fading according to JIS-L-0804. The fabric clearly yellowed 1 rank less with the organopolysiloxane (III) with the $(CH_2)_3NH_2$ group (Rating=4 to 5) than the organopolysiloxane (IV) with the $(CH_2)_3NHCH_2CH_2NH_2$ group as the amino group (Rating=3 to 4).

EXAMPLE 4

A mixture of dimethyldimethoxysilane (99.1 parts), $CH_3(CH_3O)_2Si(CH_2)_3NHCH_2CH_2NH_2$ (0.6 part), methyltrimethoxysilane (0.3 part), and potassium hydroxide (0.005 part) in water was refluxed at 95°–98° C. for 5 hours. The mixture was heated to 110° C. to evaporate methanol and water under reduced pressure of 10 mm Hg. Finally, the mixture was heated to 120° C. to yield an amino-functional organopolysiloxane (V) with a viscosity of 5,500 centistokes.

An emulsion (pH 6.2) was prepared from organopolysiloxane (V) using the method described in Example 1. Polyacrylonitrile stable fibers (100 g) were immersed in this emulsion at ambient temperature for 120 minutes, nipped, and dried with hot air at 110° C. for 10 minutes. The emulsion after treatment was clear. The adsorptivity, determined by fluorescent X-ray analysis, was 95%. The staple fibers obtained had good softness and impact resilience.

EXAMPLE 5

To a mixture of octamethylcyclotetrasiloxane (94.25 parts) and $CH_3(C_2H_5O)_2Si(CH_2)_4NH_2$ (5.24 parts) were added hexamethyldisiloxane (0.51 part) and potassium hydroxide (0.02 part). The mixture was heated similarly to Example 1 to yield an aminofunctional organopolysiloxane (VI) with a viscosity of 1,390 centistokes.

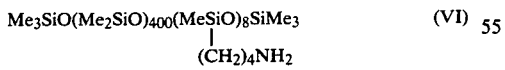

(VI)

The organopolysiloxane (VI) was converted to a treating emulsion (pH 5.5) according to the method in Example 1. A 100% cotton knitted fabric (100 g) was immersed in this emulsion or the emulsion obtained in Example 1 (pH 5.5) at room temperature for 120 minutes, nipped, and dried at ambient temperature. After treatment the emulsion became clear. The adsorptivity was 91% for the former (VI) and 90% for the latter (I).

The treated 10×10 cm fabric was heated similarly to Example 3. Yellowing (amine-burn) was rated by a gray scale for fading in JIS-L-0804. Rating for the fabric treated with the organopolysiloxane with the amino group (I) was 3 to 4, whereas that for the fabric treated with the organopolysiloxane (VI) was 4 to 5, indicating that the latter yellowed the fabric less than the former.

EXAMPLE 6

A mixture of dimethyldimethoxysilane (99.1 parts), $CH_3(C_2H_5O)_2Si(CH_2)_4NH_2$ (0.6 part), methyltrimethoxysilane (0.3 part), and potassium hydroxide (0.005 part) in water was refluxed at 95°–98° C. for 5 hours. The mixture was heated to 110° C. to evaporate methanol, ethanol, and water under reduced pressure of 100 mm Hg. Heating to 120° C. completed the condensation to yield an aminofunctional organopolysiloxane (VII) with the viscosity of 5,400 centistokes.

The organopolysiloxane (VII) was converted to a treating emulsion (pH 6) according to the method in Example 1. A polyester knitted fabric (100 g) was dipped in this emulsion at ambient temperature for 120 minutes, nipped, and dried with hot air at 110° C. for 10 minutes. The emulsion after treatment was clear. The adsorptivity, measured by fluorescent X-ray analysis, was 92%. The fabric obtained resisted creasing and had impact resilience.

EXAMPLE 7

A 30% emulsion (20 parts) of the organopolysiloxane (VI) obtained in Example 5 was diluted with water (580 parts) to yield a 1% emulsion. To this emulsion were added di-n-butyl bis(triethanolamine)titanate (0.1 part) and acetic acid to adjust the pH to 6.5. Both filter paper (Grade No. 5A from Toyo Filter Paper Co.) and a 7×7 cm polyester film were immersed in this emulsion at ambient temperature for 120 minutes and dried at room temperature and then kept at 110° C. for 5 minutes. A drop of water was not absorbed by the filter paper. The polyester film obtained could not be adhered to a cellophane adhesive tape.

That which is claimed is:

1. An organopolysiloxane composition consisting essentially of
    (A) 100 parts by weight of an organopolysiloxane having the formula $R_aX_bY_cSiO_{(4-a-b-c)/2}$; wherein R denotes a monovalent unsubstituted or substituted hydrocarbon group free of amino substitutents, X denotes an aminofunctional group having the formula $-R^1(NHCH_2CH_2)_dNHR^2$ wherein $R^1$ denotes a divalent hydrocarbon group, $R^2$ denotes a hydrogen atom or a monovalent hydrocarbon group and d has a value of 0, 1, 2, or 3; Y denotes a hydroxyl group or an alkoxy group, a+b+c has a value of from greater than 1.9001 to 2.1, a has a value of from greater than 1.9 to less than 2.1, b has a value of from 0.0001 to 0.1 and c has a value of from 0 to 0.1,
    (B) 1 to 100 parts by weight of a nonionic or cationic surfactant,
    (C) 0.1 to 50 parts by weight of an organotitanate, an organozirconate, or an organogermanate,
    (D) a sufficient amount of an organic acid to provide a pH of from 2.5 to less than 7.0 for the organopolysiloxane composition and
    (E) an emulsion-forming amount of water.

2. An organopolysiloxane composition consisting essentially of
    (A) 100 parts by weight of an organopolysiloxane having the formula

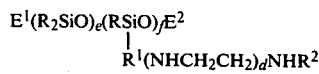

wherein $E^1$ is selected from the group consisting of —OH, —OR, —OSiR$_3$ and OSiXR$_2$, $E^2$ is selected from the group consisting of —H, —R, —SiR$_3$ and —SiXR$_2$, R denotes a monovalent unsubstituted or substituted hydrocarbon group free of amino substituents, X denotes —R$^1$(NHCH$_2$CH$_2$)$_d$NHR$^2$, R$^1$ denotes a divalent hydrocarbon group, R$^2$ denotes a hydrogen atom or a monovalent hydrocarbon group, d has a value of 0, 1, 2, or 3, e has a value of from 10 to 1,000 and f has a value of from 1 to 20, (B) 1 to 100 parts by weight of a nonionic or cationic surfactant, (C) 0.1 to 50 parts by weight of an organotitanate, an organozirconate, or an organogermanate, (D) a sufficient amount of an organic acid to provide a pH of from 2.5 to less than 7.0 for the organopolysiloxane composition and (E) an emulsion-forming amount of water.

3. An organopolysiloxane composition according to claim 2 wherein $E^1$ denotes (CH$_3$)$_3$SiO and $E^2$ denotes (CH$_3$)$_3$Si.

4. An organopolysiloxane composition according to claims 1, 2, or 3 wherein d has a value of zero.

5. An organopolysiloxane composition according to claims 1, 2 or 3 wherein component (C) is an organotitanate having at least one aminoalkoxy substituent.

6. An organopolysiloxane composition according to claim 4 wherein component (C) is an organotitanate having at least one aminoalkoxy substituent.

* * * * *

UNITED STATES PATENT AND TRADEMARK OFFICE
CERTIFICATE OF CORRECTION

PATENT NO. : 4,388,437
DATED : June 14, 1983
INVENTOR(S) : Isao Ona

It is certified that error appears in the above-identified patent and that said Letters Patent is hereby corrected as shown below:

In Column 2, line 31, "—$(CH_2)_2(CH_6H_4)$—" should read -- —$(CH_2)_2(C_6H_4)$— --.

In Column 7, line 6, "7.850" should read -- 7,850 --

Signed and Sealed this

Twenty-third Day of October 1984

[SEAL]

Attest:

*Attesting Officer*

GERALD J. MOSSINGHOFF

*Commissioner of Patents and Trademarks*